Patented May 8, 1928.

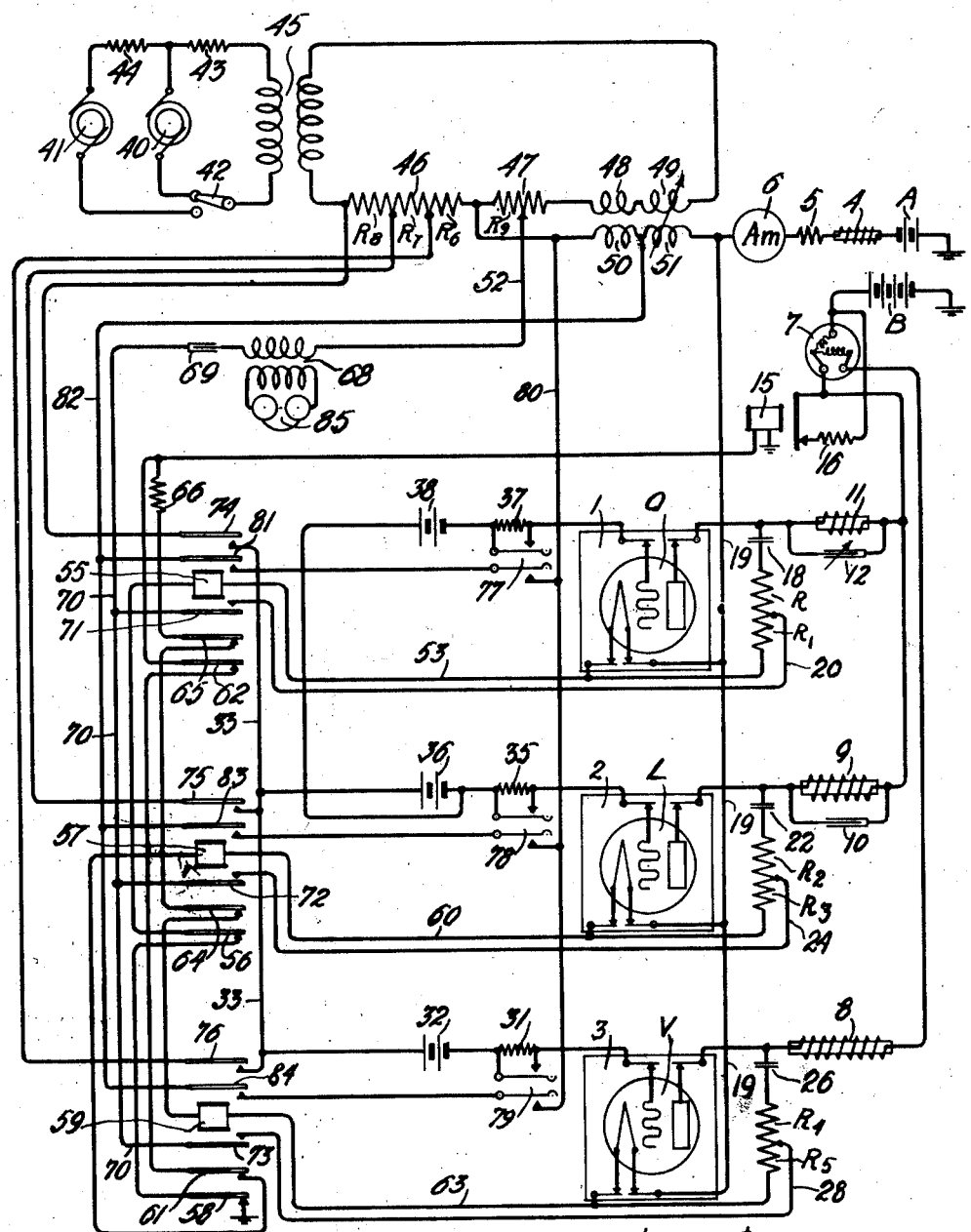

1,668,748

UNITED STATES PATENT OFFICE.

DONALD F. WHITING AND JULIAN BLANCHARD, OF NEW YORK, N. Y., ASSIGNORS TO WESTERN ELECTRIC COMPANY, INCORPORATED, OF NEW YORK, N. Y., A CORPORATION OF NEW YORK.

MEANS FOR TESTING ELECTRON TUBES.

Application filed March 23, 1923. Serial No. 627,208.

This invention relates to electrical testing, and especially to means for testing the characteristics of electron tubes, as, for instance, the voltage amplification, the power amplification or transmission gain given by such tubes.

The invention aims to provide for readily and accurately performing such tests and to provide for so performing the tests on different types of tubes and with economy of apparatus.

In the form of the invention described herein, balancing circuit connections are employed for comparing the input voltage and the output voltage of an electron tube under test, and provision is made for compensating for phase difference between the two voltages, in order that an accurate balance may be obtained. The compensation for phase difference may be obtained either by providing a capacity of proper value in the anode-cathode circuit of the tube or by providing such a capacity in the anode-cathode circuit of the tube and also introducing a mutual inductance between the two circuits which are to be compared, the capacity in the latter case being of such magnitude as to only partially compensate for the phase difference, and the mutual inductance being of such magnitude as to complete the compensation. Where different types of tubes are to be tested, a common variable mutual inductance may be used for all of the types of tubes, and a different capacity for each type of tube to be tested may be provided, the value of each capacity being selected so as to avoid any necessity for an unduly great variation of the mutual inductance used which variation might otherwise be required to obtain the desired voltage balance when one type of tube is substituted for another type.

In the form of the invention disclosed herein sockets are provided suitable to the different types of tubes to be tested. Each socket has associated therewith a tube input and a tube output circuit appropriate for the type of tube to be tested in that socket, and common tube energizing sources and common balancing circuit connections are provided for the sockets. Switching means is provided which operates upon the insertion of a tube in any one of the sockets to suitably arrange the input and output circuits and the balancing circuit connection for testing the tube in that socket, and for insuring that only one tube is energized at a time.

The single figure of the drawing shows the preferred form of the invention.

In the drawing, O, L and V represent three different types of electron tubes to be tested, as for instance, a three-electrode power tube, a three-electrode tube for high current output, and a three-electrode tube for high voltage output, respectively. When tube O is to be tested it is connected in the testing circuits to be described hereinafter by means of a conventional vacuum tube socket 1. Similarly, when tube L is to be tested, it is inserted in socket 2, and when tube V is to be tested, it is inserted in socket 3. Only one of these tubes is to be tested at a time, and, as described hereinafter, means is provided for insuring that even if a plurality of sockets are occupied at the same time only one tube at a time has its filament-heating circuit or its D. C. space current circuit or its grid-filament circuit closed.

The filament-heating current for the tubes, O, L and V is supplied from a common battery A through a retard coil 4, an adjusting resistance 5, an ammeter 6 and a lead 19. The complete filament-heating circuits will be traced hereinafter.

The D. C. space current for the tubes is supplied from a common battery B, through a common double scale ammeter 7, (having, for instance, a 0 to 2.5 milliampere scale and a 0 to 25 milliampere scale), the current for tube V passing through retard coil 8, the current for tube L passing through retard coil 9, which has a condenser 10 in parallel therewith, and the current for tube O passing through retard coil 11, which has a condenser 12 in parallel therewith. The complete circuits for the D. C. space currents will be traced, and the function of condensers 10 and 12 will be pointed out hereinafter. Since the current for tube O is large in comparison to the currents for tubes L and V, a resistance 16 is provided for shunting the part of the ammeter winding in circuit with tube O, and means is provided, as described hereinafter, whereby the resistance 16 is removed from shunting relation with respect to the meter winding whenever the L tube or the V tube is in circuit. Of course, the readings on the 25 milliampere scale when the shunt is closed, that is, when the tube O is in circuit, must be multiplied by a factor depending on the resistance of the shunt to determine the value of the current flowing in the O tube.

The A. C. output circuit for the tube O includes resistance R and condenser 18 connected in series across the filament and plate of the tube, and a circuit to be traced hereinafter tapped off from the filament and a part $R_1$ of the resistance by leads 19 and 20. Similarly, the A. C. output circuit for tube L includes a resistance $R_2$ and condenser 22 and a circuit tapped off from the filament and a part $R_3$ of the resistance $R_2$ by leads 19 and 24; and the A. C. output circuit for tube V includes resistance $R_4$ and condenser 26 and a circuit tapped off from the filament and a part $R_5$ of the resistance $R_4$ by leads 19 and 28.

The grid-filament circuit for tube V extends from the grid through a high resistance 31 of the order of 300,000 ohms, through a "C" battery 32 of a voltage appropriate for the operation of tube V, to a lead 33, and thence, over a path which will be traced hereinafter, to the filament of tube V. Similarly, the grid-filament circuit for tube L extends from the grid through resistance 35 of the order of 300,000 ohms, through a "C" battery 36, of a voltage appropriate for tube L, to the lead 33, and thence, over a path which will be traced hereinafter, to the filament of tube L. Similarly, the grid-filament circuit for the tube O extends from the grid through a resistance 37 of the order of 300,000 ohms, through a "C" battery 38, 36, of a voltage appropriate for tube O, to the lead 33 and thence, over a path to be traced hereinafter, to the filament of tube O.

Alternating current of a definite frequency is supplied to the grid circuits from either of the sources 40 or 41, which represent oscillators, alternators or any suitable A. C. generators, these sources comprising filters (not shown) if desired, for insuring that the tone supplied is a pure tone, since the presence of harmonics fould render it difficult to obtain the desired voltage balance. A switch 42 is used to select the desired source. Resistances 43 and 44 are adjusted to give a suitable current in the secondary winding of a transformer 45 which has its primary winding in circuit with the generator 40 or the generator 41, the secondary winding supplying current to resistances 46 and 47 and coils 48 and 49 all in series. Coils 48 and 49 are in current inducing relation to coils 50 and 51, respectively, and the coupling between the coils 49 and 51 is variable.

Resistance 46 consists of three parts, $R_6$, $R_7$, and $R_8$. A lead 52 is adjustable along the resistance 47, and the part of resistance 47 which lies to the left of the tap connection 52 is designated $R_9$.

The D. C. space current circuit for tube O was traced above from battery B, one side of which is grounded, through ammeter 7 and shunt 16 in parallel, and thence through coil 11 to the plate of tube O. Thence the circuit continues through the tube to the filament, and thence in common with the filament-heating circuit, through lead 53, the winding of a relay 55, an armature 56 of a relay 57, and an armature 58 of a relay 59, to ground and back to battery B.

The D. C. space current circuit for tube L was traced above from battery B through ammeter 7 and coil 9 to the plate of the tube. Thence the circuit continues through the tube to the filament, and thence, in common with the filament-heating circuit, through lead 60, the winding of the relay 57, an armature 61 of the relay 59, an armature 62 of the relay 55, the winding of the relay 15, and ground, back to battery B. Since this circuit energizes relay 15, the resistance 16 is removed from shunting relation with respect to the ammeter 7 whenever an L tube is receiving filament-heating current.

The D. C. space current circuit for tube V was traced above from battery B through ammeter 7 and coil 8 to the plate of the tube. Thence the circuit continues through the tube to the filament, and thence, in common with the filament-heating circuit, through lead 63, the winding of relay 59, an armature 64 of relay 57, an armature 65 of relay 55, and a resistance 66 (inserted to reduce the voltage on the filament of the tube V), the winding of relay 15, and ground, back to battery B. Since this circuit energizes relay 15, the resistance 16 is removed from shunting relation with respect to the ammeter 7 whenever a V tube is receiving filament-heating current.

As noted above, an A. C. output circuit for tube O is tapped off from the filament of the tube and a part $R_1$ of the resistance R by leads 19 and 20. This circuit extends from lead 19 through coils 51 and 50, resistance $R_9$, the primary winding of a transformer 68, a condenser 69, a lead 70, and an armature 71 of relay 55, to lead 20.

As noted above, an A. C. output circuit for tube L is tapped off from the filament of the tube and a part $R_3$ of the resistance $R_2$ by leads 19 and 24. This circuit extends from lead 19 through coils 51 and 50, resistance $R_9$, the primary winding of the transformer 68, the condenser 69, the lead 70 and an armature 72 of the relay 57, to lead 24.

As noted above, an A. C. output circuit for tube V is tapped off from the filament of the tube and a part $R_5$ of the resistance $R_4$ by leads 19 and 28. This circuit extends from lead 19 through coils 51 and 50, resistance $R_9$, the primary winding of the transformer 68, the condenser 69, the lead 70, and an armature 73 of the relay 59 to lead 28.

The grid-filament circuit of tube O was traced above from the grid of the tube through the resistance 37 and the "C" battery 38, 36, to the lead 33. Thence the circuit continues through an armature 74 of the relay 55, the resistance 46, the coils 50 and 51, and the lead 19 to the filament of the tube. Similarly, the grid-filament circuit of the L tube extends from the grid of the tube through the resistance 35, the "C" battery 36, the lead 33, an armature 75 of the relay 57, the resistances $R_7$ and $R_6$, the coils 50 and 51, and the lead 19, to the filament of the tube. Similarly, the grid filament circuit for tube V extends from the grid of the tube through the resistance 31, the "C" battery 32, the lead 33, an armature 76 of the relay 59, the resistance $R_6$, the coils 50 and 51, and the lead 19, to the filament of the tube.

As explained hereinafter, at times during the course of certain tests on the O, L and V tubes, it is desirable to short-circuit the resistance 37, 35 or 31 in the grid-filament circuit of the tube under test, and at the same time to short-circuit the coil 50. This is accomplished by closing one of the keys 77, 78 and 79. Thus, if the key 77 be closed while the O tube is receiving filament-heating current, the resistance 37 will be short-circuited through the key, and the coil 50 will be short-circuited by means of a circuit extending from the left-hand end of the coil, a lead 80, the key 77, an armature 81 of the relay 55, and a lead 82, to the right-hand end of the coil 50. Similarly, if the key 78 be closed while an L tube is receiving filament-heating current, the resistance 35 will be short-circuited through the key 78, and the coil 50 will be short-circuited by means of a circuit extending from the left-hand end of the coil, through the lead 80, the key 78, an armature 83 of the relay 57, and the lead 82, to the right-hand end of the coil 50. Similarly, if the key 79 be closed while a V tube is receiving filament-heating current, the resistance 31 will be short-circuited at the key 79, and the coil 50 will be short-circuited by means of a circuit extending from the left-hand end of the coil, through the lead 80, the key 79, an armature 84 of the relay 59, and the lead 82, to the right hand end of the coil 50.

The secondary winding of the transformer 68 feeds a current indicator, such, for instance, as a telephone receiver 85, the testing of the tubes involving, in general, the adjusting of $R_9$ to balance the voltage drop across $R_9$ against the voltage across one of the resistances $R_1$, $R_3$ or $R_5$, the voltage balance being indicated at the receiver 85 by absence of the sound corresponding to the frequency of the current supplied by transformer 45. When the voltage balance has been obtained, the voltage amplification factor $m_0$ of the tube can be readily ascertained, since it is apparent that then, if the secondary current of the transformer 45 be designated $I_1$, we have for the O tube, $$m_0 I_1 (R_8 + R_7 + R_6) \frac{R_1}{R} =$$

(the voltage across $R_1$) $= I_1 R_9$, whence $$m_0 = \frac{R R_9}{R_1 (R_8 + R_7 + R_6)};$$

or, for the case of a balance with an L tube, we have $$m_0 I_1 (R_7 + R_6) \frac{R_3}{R_2} =$$

(the voltage across $R_3$) $= I_1 R_9$, whence $$m_0 = \frac{R_2 R_9}{R_3 (R_7 + R_6)};$$

or, for the case of a balance with a V tube, we have $$m_0 I_1 R_6 \frac{R_5}{R_4} = \text{(the voltage across } R_5 \text{)} = I_1 R_9,$$

whence $$m_0 = \frac{R_4 R_9}{R_5 R_6}.$$

In these expressions for the amplifying factors of the O, L and V tubes, the only variable is $R_9$. The resistances $R_6$, $R_7$, $R_8$, $R$, $R_2$ and $R_4$ are arbitrary and can be chosen to make the coefficient of $R_9$ the same for each type of tube. Hence the resistance $R_9$ can be supplied with a scale common to all of the types of tubes from which the amplification factor can be read directly.

Thus, to obtain the voltage amplification factor of a tube of any one of the three types, the tube is inserted in the socket assigned to that type of tube, the lead 52 is adjusted along the resistance $R_9$, until the condition of voltage balance described above is obtained as indicated at the telephone receiver 85, and the voltage amplifying factor of the tube under test is then read from the scale at $R_9$.

However, in null method measurements of this kind the definiteness with which balance can be established depends upon the extent to which the indicating device, such as the telephone receiver, can be brought to a zero indication. There will be an adjustment which will produce minimum sound and which is the desired adjustment, but it is difficult to decide precisely when the sound is a minimum unless it can be reduced to zero. In the circuit described above it will be possible to reduce the sound in the telephone to zero only if the two electromotive forces in the telephone circuit, tending to send currents in opposite directions, respectively, through the receiver, are in phase.

In general, however, the presence of the capacities between the elements within the tube are such as to produce a slight phase displacement of the output electromotive force of the tube, and this renders accurate tests of the tube difficult. Moreover, an additional phase difference is caused by the reactance introduced by the coil 8, 9 or 11, and the condenser 10 or 12 in the circuit of the tube under test. Further, in testing vacuum tubes, it is desirable that they shall be tested under conditions which closely approximate operating conditions. For most cases in which the vacuum tube is used as an amplifier, and particularly in telephone practice, the impedance of the input circuit as seen looking from the tube is quite high, being several hundred thousands of ohms. For this reason, in taking measurements on vacuum tubes it is desirable to introduce in the input circuit a resistance, such as 31, 35 or 37, which will give an impedance as seen looking from the tube substantially equal to that which the tube faces in operation. Moreover, the introduction of the resistance 31, 35 or 37 is necessary in order to make grid insulation tests, as explained hereinafter. The resistance 31, 35 or 37, together with the capacity of the grid, introduces a further phase shift, and all the factors taken together give such a substantial difference in phase between the input and the output electromotive force as to prevent accurate tests of a tube from being readily made unless some means for compensating for the phase difference is adopted. Various means may be employed.

One means is to connect a small variable condenser, such as the condenser 12, across the retard coil in the D. C. space current circuit of the tube under test. For the O tube for instance, by adjustment of the inductance of the retard coil 11 or the capacity of the condenser 18, some value of capacity can be found for condenser 12 which will give zero sound in the receiver 85. Increasing the capacity of the condenser 12, increasing the inductance of coil 11, or increasing the capacity of the condenser 18 each changes the phase in the same direction. Where a condenser, such as condenser 12, is relied upon to obtain the desired phase compensation, the condition of voltage balance described above is found by first moving lead 52 along resistance 47 to adjust $R_9$ so that the sound in the receiver 85 is a minimum, which, in general, will not be zero. The capacity 12 is then varied for further reduction of sound to a minimum. If necessary, further adjustments of $R_9$ and capacity 12 may be made, until the sound reaches zero value, and under these circumstances it is possible to get a much more accurate setting of the resistance $R_9$.

However, where the circuit of the tube under test includes a resistance such as 37, the phase difference occurring between the input voltage and the output voltage is so large that if the method of phase compensation described above be relied upon, the changes required in the value of the inductance 11 or the capacity 18 may be undesirably great, and, therefore, it will generally be preferable to utilize a method which is described in U. S. Patent No. 1,515,660 to George Crisson, issued November 18, 1924, and which consists in employing the adjustable mutual inductance 48, 50, 49, 51, the primary windings 48 and 49 of which are inserted in series with the secondary winding of the transformer 45, the secondary windings 50 and 51 of the mutual inductance being inserted in series in the circuit of the primary winding of the transformer 68 which feeds the telephone receiver 85 and also in the grid-filament circuit of the tube under test. Thus, for an O tube, for instance the circuit of the primary winding of the transformer 68 extends from the filament of the tube, through the lead 19, the coils 51 and 50, the resistance $R_9$, the lead 52, the primary winding of the transformer 68, the condenser 69, the armature 71 of the relay 55, and the lead 20, to the resistance R; and the grid-filament circuit for the tube extends from the grid through the elements 37, 38, 36, 33, 74, 46, 50, 51 and 19, to the filament of the tube. To obtain the condition of voltage balance described above, the lead 52 is first moved along the resistance 47 to adjust $R_9$ so that the sound in the receiver 85 is a minimum, which, in general, will not be zero. The mutual inductance between coils 49 and 51 is then varied for further reduction of sound to a minimum; and if necessary, further adjustments of $R_9$ and inductance 49—51 may be made until the sound reaches zero value.

However, where different types of tubes are to be tested, and widely different values of mutual inductance would therefore be required in order to obtain the desired phase compensation, it frequently becomes desirable to combine the two methods of phase adjustment which have been described above. Thus, in the system shown in the drawing for testing O, L and V tubes, the retard coils 9 and 11 in the D. C. space current circuits of the O and the L tubes, respectively, are shunted by condensers 10 and 12, respectively, of such capacities as to make approximately the same value of the mutual inductance 48, 50, 49, 51 serve for all three tubes. (Although condensers 12 and 10 are shown as variable, their capacities may well have fixed values, only the inductance 48, 50, 49, 51 being varied to obtain the desired phase adjustments in the tests on any of the three types of tubes.) Thus, it is possible to avoid the necessity of wide variation of the mutual inductance.

As indicated above, each of the keys 77, 78 and 79 is arranged, as shown in the drawing, to short-circuit the coil 50 when the key is closed to short-circuit one of the resistances 37, 35 and 31. This short-circuiting of coil 50 produces a large percentage change in the mutual inductance 48, 50, 49, 51 to approximately compensate for the change in phase difference between the input and output voltages of the tube under test due to the short-circuiting of the resistance. However, the change of mutual inductance required for this compensation is approximately the same for all of the types of tubes; and therefore, it is feasible to have the mutual inductance 48, 50, 49, 51 separated into the relatively large fixed mutual inductance 48, 50 and the relatively small variable mutual inductance 49, 51 the cutting into circuit of the fixed part serving to approximately compensate for the cutting in of the resistance 37 or 35 or 31, and the variation of the small mutual inductance 49, 51 serving to complete the phase compensation required. The variable mutual inductance 49, 51 being small, provides for fine adjustment of the phase compensation.

The provision for obtaining the condition of voltage balance described above both with the resistance such as 37 in circuit and with such resistance short-circuited, is for the purpose of facilitating the detection of poor grid insulation by a comparison of the voltage amplification or the "miles gain" given by a tube when the resistance, such as 37, is in circuit, with the amplification or gain given by the tube when the resistance, such as 37, is short-circuited. If the tube is in perfect condition, the resistance of the gap between the grid and the filament or the grid and the plate, is practically infinite, and consequently the introduction into the grid circuit of a resistance such as 37 of the magnitude of several hundred thousand ohms would cause practically no variation in the normal output current and only a very small change in the gain. If, however, the tube is defective with respect to the grid insulation, in that leakage exists between the grid and the filament, or more especially if leakage exists between the grid and the plate, then the introduction of a resistance such as 37 into the circuit will appreciably affect the potential of the grid, and in consequence the output current and gain will be appreciably affected, thus indicating "grid leakage".

In making an insulation test by noting the change in gain when resistance such as 37 is cut in and out, the peak A. C. input voltage should not exceed the fixed D. C. negative potential of the grid with respect to the filament. Otherwise, when the grid becomes positive during a half cycle, an electron current flows from filament to grid, the result being the same as an insulation leak, and thus a false indication as to grid insulation is given.

Since whenever the winding of relay 55 in the filament heating circuit of the O tube is energized, it opens the filament heating circuits of the L and the V tubes at armatures 62 and 65, respectively, neither an L tube nor a V tube can receive filament-heating current while an O tube is receiving filament-heating current. Similarly, whenever the winding of relay 57 in the filament-heating circuit of the L tube is energized, it opens the filament-heating circuits of the O and the V tubes at armatures 56 and 64, respectively. Similarly, whenever the winding of relay 59 in the filament-heating circuit of tube V is energized, it opens the filament-heating circuits of the O and the L tubes at armatures 58 and 61, respectively. Thus, if when a tube of one type is in its socket a tube of another type is inserted in a second socket, the second tube will receive no filament-heating current until the first tube is removed from the first socket. Moreover, since the upper front contacts of the relays 55, 57 and 59 control the continuity of the grid-filament circuits of the tubes O, L and V, respectively, the grid-filament circuit of the tube to be tested is automatically closed upon the insertion of that tube in a socket, and until the tube is removed no other grid-filament circuit can be closed. Further, since the next lower front contacts of the relays 55, 57 and 59 are respectively in series with those contacts of keys 77, 78 and 79 that are in the short-circuiting paths about the coil 50, that coil can be short-circuited only by the particular one of the keys 77, 78 and 79 that corresponds to a tube which is receiving filament-heating current. Moreover, since the lower front contacts of relays 55, 57 and 59 are in series in the leads 20, 24 and 28, respectively, which form serial links in the circuits connecting the primary winding of transformer 68 to the resistances R, $R_2$ and $R_4$, respectively, the A. C. output circuit of the tube to be tested is automatically closed through the primary winding of the transformer 68 upon the insertion of the tube in a socket, and until the tube is removed neither of the corresponding circuits for the other sockets can be closed. It is apparent that the tube input and output circuits associated with the test sockets have been provided with automatic switching means which suitably arranges the circuits for testing any one of several types of tubes and which guards against the connection of a tube in the testing circuits while another tube is connected for test.

While this invention has been described as applied specifically to the test or measurement of the amplifying factor of a vacuum tube, it is apparent that it can be used equally well in the measurement of any of the other characteristics of the vacuum tube in which a null method such as described, is applicable, and, therefore, it is not limited to the specific illustration given. Also, while the specification has described particularly a method and apparatus for comparing output and input voltage, it is apparent that they may be used for comparing output and input power since the output power is proportional to the square of the voltage amplifying factor. This is especially convenient in case a constant output impedance is to be used, for the potentiometer may then be calibrated to read directly in terms of power ratio. Again, in such work as telephone communication it may be desirable to express the power ratio in terms of "miles of gain" on some standard cable.

It is not necessary that the condensers shown connected across the retard coils in the D. C. space current supply circuits of the tubes be connected at these particular places in the tube circuits. Good results may be obtained with a condenser connected across the resistance R or the resistance $R_2$, for instance, instead of across the coil 11 or the coil 9. However, the arrangement shown in the drawing is the preferred form of the invention.

It will be seen that the arrangement disclosed herein provides simple and effective means for quickly and accurately determining the magnitude of the gain to be obtained by a tube of any type. Although the arrangement as disclosed provides for the testing of only three types of tubes, the invention is not so limited, since a circuit embodying the principle of this invention may be designed to test any number of types of tubes.

Although in the drawing only part of the voltage across the resistances, such as resistance R, is included in the potentiometer circuit, it is obvious that any desired portion may be used even up to the entire voltage.

Although this invention has been described in a particular circuit arrangement, it is to be understood that it is capable of embodiment in other arrangements without departing from the spirit of the invention or the scope of the appended claims.

The invention claimed is:

1. In a circuit for testing the characteristics of electron tubes, a potentiometer circuit for balancing output voltage against input voltage and a condenser in shunt relation to a part of the space current supply circuit, of such value as to compensate for phase difference between input and output voltage.

2. In a system for testing the characteristics of electron tubes, a grid-filament circuit and an anode-cathode circuit for the tube under test, a balancing circuit for balancing input voltage against output voltage, and a condensive reactance in one of the two first-mentioned circuits and of such value as to compensate for phase difference between the input voltage and the output voltage.

3. The method of determining the characteristics of electron tubes which comprises combining with the output voltage of the tube under test a reactive voltage of negative sign and of a value sufficient to bring the resultant output voltage into phase with the tube input voltage, and balancing the latter voltage against said resultant voltage.

4. The method of controlling an electron tube and a potentiometer circuit for comparing the output voltage and the input voltage of the tube, which comprises electromagnetically inducing into the potentiometer circuit a voltage at right angles to said input voltage, for partially compensating for phase difference between said input voltage and said output voltage, and introducing into the anode-cathode circuit of the tube a reactive voltage of negative sign and of such value as to complete the compensation for said phase difference.

5. In a circuit for testing the characteristics of electron tubes, a potentiometer circuit for balancing output voltage of the tube under test against input voltage a mutual inductance in said potentiometer to partially compensate for phase difference between input and output voltage and a condenser, in the anode-cathode circuit of the tube, of such value as to complete compensation for said phase difference.

6. A system for testing the characteristics of a plurality of electron tubes of different types, said system comprising a plurality of external tube output circuits each having impedances therein simulating the load conditions encountered in the normal operation of one of said types of tubes, one for each of said tubes, a balancing circuit for comparing the input voltage and the output voltage of any one of said tubes by a null method and means associated with each of said circuits for compensating for phase difference between said input and output voltages tending to make the comparison of said voltages inaccurate.

7. A system for testing the characteristics of a plurality of electron tubes, said system comprising a tube socket for each of said tubes, tube input and output circuits associated with said sockets, and switching means associated with said circuits and controlled by the insertion of a tube in any one of said sockets for arranging said circuits for test of said tube, and for also preventing the connection of another tube in said circuits while said first tube is connected for test.

8. A system for testing the characteristics of electron tubes of different types, said system comprising a tube socket for each of said types of tubes, a source of filament heating current associated with all of the sockets, a potentiometer circuit for comparing the input voltage and the output voltage of any one of said tubes, and means, actuated upon the insertion of a tube in one of said sockets, for preventing the supply of filament heating current to another of said sockets.

9. A system for testing the characteristics of electron tubes of different types, said system comprising a socket for each of said types of tubes, a resistance associated with each of said sockets, for connection in shunt relation to the anode and cathode of a tube received by the socket, a source of alternating electromotive force, means comprising switch contacts for connecting the grid terminals of said sockets with points of different potential on said source, means connecting a point of another potential on said source to a filament terminal of each of said sockets, a balancing circuit comprising a current indicating device, for comparing the input voltage and the output voltage of any one of said tubes by a null method, means whereby said circuit may be connected to points of different potential on said source, switch contacts for connecting said circuit to a point on any one of said resistances, a filament-heating circuit associated with each of said sockets, means responsive to current in one of said filament-heating circuits for causing the first-mentioned switch contacts to connect the corresponding grid to said source and causing the second-mentioned switch contacts to connect said circuit to said point on the corresponding one of said resistances, and means for compensating for phase shift between the input voltage and the output voltage of the tube under test, said means comprising a variable mutual inductance having a primary winding in circuit with said source and a secondary winding in circuit between the filament and the grid of the tube under test.

10. A system for testing electron tubes, said system comprising an alternating current source for supplying electromotive force to the grid-filament circuit of the tube under test, a balancing circuit for comparing the input voltage and the output voltage of the tube by a null method, a high resistance in series with the grid of the tube, means for compensating for phase difference between the input voltage and the output voltage, said means comprising a mutual inductance having primary turns in circuit with said alternating current source and secondary turns in the grid-filament circuit of the tube, means for short-circuiting said high resistance, and means controlled by said last-mentioned means for controlling said mutual inductance.

11. In combination, a source of electrical variations, an amplifier, means for supplying variations from said source to said amplifier, an output circuit for said amplifier, said means having a point in common with said output circuit, and means electrically connecting a point of different potential of said first mentioned means with a point of said output circuit at such potential, regarding both phase and magnitude, that the current in one of said means is zero.

12. A circuit for testing the characteristics of voltage amplifying means comprising a potentiometer circuit for balancing the input voltage of the voltage amplifying means against its output voltage, and reactance means for compensating for phase difference between the input and output voltage.

In witness whereof, we hereunto subscribe our names this 20th day of March, A. D. 1923.

DONALD F. WHITING.
JULIAN BLANCHARD.